US008583307B2

(12) United States Patent
Kato et al.

(10) Patent No.: US 8,583,307 B2
(45) Date of Patent: Nov. 12, 2013

(54) POWER SUPPLY SYSTEM FOR ELECTRICALLY POWERED VEHICLE AND METHOD FOR CONTROLLING THE SAME

(75) Inventors: Norihiko Kato, Handa (JP); Masaya Yamamoto, Kasugai (JP); Haruki Sato, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 16 days.

(21) Appl. No.: 13/377,439

(22) PCT Filed: Jun. 10, 2009

(86) PCT No.: PCT/JP2009/060588
§ 371 (c)(1),
(2), (4) Date: Dec. 9, 2011

(87) PCT Pub. No.: WO2010/143277
PCT Pub. Date: Dec. 16, 2010

(65) Prior Publication Data
US 2012/0089290 A1    Apr. 12, 2012

(51) Int. Cl.
*B60L 11/18*    (2006.01)
(52) U.S. Cl.
USPC ........... 701/22; 903/903; 903/907; 180/65.29
(58) Field of Classification Search
USPC ............. 701/22, 54; 180/65.1, 65.21, 65.265, 180/245, 65.25, 65.28, 65.29; 307/85, 86; 320/125, 126, 132, 136
See application file for complete search history.

(56) References Cited

U.S. PATENT DOCUMENTS

| 5,841,201 A * | 11/1998 | Tabata et al. ................. 290/40 C |
| 8,004,104 B2 * | 8/2011 | Hench .............................. 290/53 |
| 2010/0038962 A1 | 2/2010 | Komatsu |
| 2010/0096918 A1 | 4/2010 | Sawada et al. |

FOREIGN PATENT DOCUMENTS

| JP | 2004-312863 A | 11/2004 |
| JP | 2004-359032 A | 12/2004 |
| JP | 2008-109840 A | 5/2008 |
| JP | 2008-167620 A | 7/2008 |
| JP | 2008-220084 A | 9/2008 |

OTHER PUBLICATIONS

International Search Report mailed Sep. 15, 2009 of PCT/JP2009/060588.

* cited by examiner

*Primary Examiner* — Thomas Black
*Assistant Examiner* — Marthe Marc-Coleman
(74) *Attorney, Agent, or Firm* — Kenyon & Kenyon LLP

(57) ABSTRACT

A power supply system includes a main power storage device and a plurality of sub power storage devices. A converter is connected to a selected one of the sub power storage devices to convert voltage between the selected sub power storage device and an electric power feeding line bidirectionally. Connection of the sub power storage device is switched and, when the last sub power storage is used, a request to disconnect the sub power storage device is generated based on the SOC of the sub power storage device and the vehicle state. Specifically, where the SOC is included in a disconnection forced region in which the SOC is smaller than a reference lower limit, the sub power storage device is forced to be disconnected regardless of the vehicle state. Where the SOC is included in a disconnection permitted region in which the SOC is higher than that in the disconnection forced region, the disconnection request is generated on condition that the vehicle is in such a state that will not affect vehicle's drivability.

10 Claims, 10 Drawing Sheets

POWER SUPPLY SYSTEM FOR ELECTRICALLY POWERED VEHICLE AND METHOD FOR CONTROLLING THE SAME

This is a 371 national phase application of PCT/JP2009/060588 filed 10 Jun. 2009, the contents of which are incorporated herein by reference.

TECHNICAL FIELD

The present invention relates to a power supply system for an electrically powered vehicle and a method for controlling the same. More specifically, the present invention relates to control of a power supply system for an electrically powered vehicle mounted with a main power storage device and a plurality of sub power storage devices.

BACKGROUND ART

In recent years, electrically powered vehicles such as electric vehicles, hybrid vehicles, fuel cell vehicles and the like have been developed into practical use as environmentally friendly vehicles. These electrically powered vehicles are each mounted with a motor generating force to drive the vehicle as well as a power supply system configured to include a power storage device for supplying electric power to drive the motor.

In particular, it has been proposed to configure a hybrid vehicle in such a manner that allows a power storage device mounted on the vehicle to be charged by means of a power supply external to the vehicle (hereinafter also referred to as "external power supply"). There has accordingly been a demand for an increased distance over which these electrically powered vehicles can travel using the electric power stored in the vehicle-mounted power storage device. In the following, charging of a vehicle-mounted power storage device by an external power supply will also be referred to simply as "external charging".

For example, Japanese Patent Laying-Open No. 2008-109840 (Patent Literature 1) describes a power supply system having a plurality of power storage devices (batteries) connected in parallel. The power supply system described in Patent Literature 1 includes a voltage converter (converter) provided for each power storage device (battery) and serving as a charging/discharging adjustment mechanism. In contrast, Japanese Patent Laying-Open No. 2008-167620 (Patent Literature 2) describes a power supply device in a vehicle mounted with a main power storage device and a plurality of sub power storage devices. The power supply device is configured to include a converter associated with the main power storage device and a converter shared by the plurality of sub power storage devices. This configuration can be employed to have a reduced number of device components and an increased amount of energy that can be stored.

In particular, regarding the configuration described in Patent Literature 2, one of a plurality of sub power storage devices is selectively connected to the converter, and the main power storage device and the selected sub power storage device supply electric power for driving the motor used for driving the vehicle. In such a power supply system, when the SOC (State of Charge) of the sub power storage device in use decreases, another sub power storage device is newly connected to the converter. Namely, a plurality of sub power storage devices are used by turns so as to extend the distance over which the vehicle can travel with the stored electric energy (EV (Electric Vehicle) travel distance).

CITATION LIST

Patent Literature

PTL 1: Japanese Patent Laying-Open No. 2008-109840
PTL 2: Japanese Patent Laying-Open No. 2008-167620

SUMMARY OF INVENTION

Technical Problem

In the power supply system described in Patent Literature 2, when all sub power storage devices have been exhausted, positively all of the sub power storage devices may be electrically disconnected from the converter so that an increased degree of freedom in subsequent control of the power supply system can be expected.

For the last available one sub power storage device in use, however, the timing of such disconnection has to be appropriately determined. In particular, before the sub power storage device which is used last has been discharged to such an extent that adversely affects the battery performance, the sub power storage device has to be disconnected so as to stop use of the sub power storage device. As for disconnection of a selected sub power storage device, the timing of disconnection has to be taken into consideration so as to minimize the possibility that disconnection affects the vehicle's drivability, since the electric power available from the power supply system as a whole inevitably decreases while the process for disconnecting the selected sub power storage device is being performed.

The present invention has been made to solve such a problem, and an object of the invention is, in a power supply system for an electrically powered vehicle configured to include a main power storage device and a plurality of sub power storage devices and share a voltage converter (converter) by the plurality of sub power storage devices, to disconnect the last available sub power storage device whose use has come to an end, at a timing appropriate in terms of both of battery protection and vehicle's ensured drivability.

Solution to Problem

According to the present invention, a power supply system is provided for an electrically powered vehicle mounted with a motor for generating power to drive the vehicle, and includes a main power storage device, an electric power feeding line, a first voltage converter, a plurality of sub power storage devices provided in parallel to each other, a second voltage converter, a connection unit, and a control device. The electric power feeding line is configured to supply electric power to an inverter that controls and drives the motor. The first voltage converter is provided between the electric power feeding line and the main power storage device and configured to convert voltage bidirectionally. The second voltage converter is provided between the plurality of sub power storage devices and the electric power feeding line and configured to convert voltage between one of the plurality of sub power storage devices and the electric power feeding line bidirectionally. The connection unit is provided between the plurality of sub power storage devices and the second voltage converter and configured to control connection and disconnection between the plurality of sub power storage devices and the second voltage converter. The control device is operative in a first mode for controlling the connection unit to connect a selected sub power storage device selected sequentially from the plurality of sub power storage devices to the second voltage converter and also disconnect the sub power storage device other than the selected sub power storage device from the second voltage converter, and operative in a second mode for controlling the connection unit to disconnect each of the plurality of sub power storage devices from the second voltage converter. The control device includes first to third determination units. The first determination unit is configured to detect a first state where a residual capacity of the selected sub power storage device currently in use is smaller than a first reference value set in advance, when no sub power storage device replaceable with the selected sub power storage device currently in use is left in the first mode. The second determination unit is configured to generate a disconnection request for giving an instruction to shift the first mode to the second mode, depending on a vehicle state relevant to an ability to fulfill a total required power of the electrically powered vehicle, when the first determination unit detects the first state. The third determination unit is configured to generate the disconnection request regardless of the vehicle state, when no available sub power storage device is left other than the selected sub power storage device currently in use in the first mode and a second state is detected where the residual capacity of the selected sub power storage device falls below a second reference value smaller than the first reference value.

Further, according to the present invention, a method for controlling a power supply system for an electrically powered vehicle is provided. The electrically powered vehicle includes a main power storage device, an electric power feeding line, a first voltage converter, a plurality of sub power storage devices, a second voltage converter, a connection unit, and a control device, as described above. The method includes the steps of: detecting a first state where a residual capacity of the selected sub power storage device currently in use is smaller than a first reference value set in advance, when no sub power storage device replaceable with the selected sub power storage device currently in use is left in the first mode; generating a disconnection request for giving an instruction to shift the first mode to the second mode, depending on a vehicle state relevant to an ability to fulfill a total required power of the electrically powered vehicle, when the first state is detected in the step of detecting; and generating the disconnection request regardless of the vehicle state, when no available sub power storage device is left other than the selected sub power storage device currently in use in the first mode and a second state is detected where the residual capacity of the selected sub power storage device falls below a second reference value (TH2) smaller than the first reference value.

Regarding the above-described power supply system for an electrically powered vehicle as well as the method for controlling the same, whether or not the last selected sub power storage device should be disconnected is determined based on the residual capacity (SOC) of the sub power storage device, with respect to two different reference values in the first mode. Thus, an SOC region (disconnection permitted region) where a disconnection request is generated based on the vehicle state when the SOC decreases, and an SOC region (disconnection forced region) where the disconnection request is generated to force the sub power storage device to be disconnected regardless of the vehicle state when the SOC further decreases can be provided. Accordingly, when the SOC falls into the disconnection forced region, the disconnection request can be immediately generated for the sake of battery protection. When the SOC is included in the disconnection permitted region before reaching the disconnection forced region, the disconnection request can be generated when the vehicle is in such a state that will not affect the vehicle's drivability. In this way, the process for disconnecting the last sub power storage device as its use has comes to an end can be performed at an appropriate timing with both of battery protection and vehicle's ensured drivability taken into consideration.

Preferably, the second determination unit or the step of generating a disconnection request generates the disconnection request on condition that the total required power of the electrically powered vehicle is smaller than a reference value when the first state is detected. More preferably, the reference value is set in a variable manner based on an upper limit on electric power output of the main power storage device.

In this way, the request to disconnect the sub power storage device can be generated only when the total required power of the vehicle falls in a range that can be fulfilled by the electric power supplied from the main power storage device, in consideration of the fact that the electric power of the sub power storage device is unavailable when the sub power storage device is being disconnected. Accordingly, in the process for disconnecting the sub power storage device, deterioration in drivability, namely a delay in the response to a driver's request due to insufficient ability to provide the total required power can be avoided.

Still preferably, the electrically powered vehicle further includes an internal combustion engine configured to be capable of outputting power to drive the vehicle independently of the motor, and a traveling control unit for dividing and thus assigning the total required power of the electrically powered vehicle to power output from the motor and power output from the internal combustion engine. The second determination unit or the step of generating a disconnection request generates the disconnection request on condition that the internal combustion engine is operating when the first state is detected.

In this way, in a hybrid vehicle mounted with a motor and an internal combustion engine, the sub power storage device with its SOC decreased can be disconnected when the vehicle is in such a state that can immediately absorb an increase in total required power as the internal combustion engine has already been started.

Preferably, the control device further includes a step-up-voltage instruction unit, an electric power limiter unit, a disconnection control unit, and a stop-stepping-up-voltage permission unit. The step-up-voltage instruction unit is configured to instruct the first voltage converter to provide a voltage on the electric power feeding line to be a first voltage higher than at least voltages output from the main power storage device and the plurality of sub power storage devices, respectively, when the disconnection request is generated. The electric power limiter unit is configured to decrease an upper limit on electric power input and output of the selected sub power storage device gradually to zero after the voltage on the electric power feeding line has reached the first voltage. The disconnection control unit instructs the connection unit to disconnect the selected sub power storage device from the second voltage converter and also hold the sub power storage device other than the selected sub power storage device disconnected from the second voltage converter, when the electric power limiter unit sets to zero the upper limit on electric power input and output. The stop-stepping-up-voltage permission unit is configured to decrease a lower limit of a voltage control range for the electric power feeding line to be smaller than the lower limit in the first mode to set the lower limit to an output voltage of the main power storage device, after the disconnection control unit disconnects each of the sub power storage devices from the second voltage converter. The method further includes the steps of: instructing the first voltage converter to provide a voltage on the electric power feeding line to be a first voltage higher than at least voltages output from the main power storage device and the plurality of sub power storage devices, respectively, when the disconnection request is generated; decreasing an upper limit on electric power input and output of the selected sub power storage device gradually to zero after the voltage on the electric power feeding line has reached the first voltage; instructing the connection unit to disconnect the selected sub power storage device from the second voltage converter and also hold the sub power storage device other than the selected sub power storage device disconnected from the second voltage converter, when the upper limit on electric power input and output is set to zero in the step of decreasing; and decreasing a lower limit of a voltage control range for the electric power feeding line to be smaller than the lower limit in the first mode to set the lower limit to an output voltage of the main power storage device, after each of the sub power storage devices is disconnected from the second voltage converter in the step of instructing the connection unit.

In this way, when a sub power storage device is to be disconnected, the voltage on the electric power feeding line is increased to the first voltage higher than respective output voltages of the main power storage device and a sub power storage device to be used next, and thereafter the sub power storage device to be used next can be connected to the second voltage converter. Thus, a short circuit path can be prevented from being formed between the sub power storage device and the main power storage device via the electric power feeding line. Moreover, the connection unit disconnects all sub power storage devices from the converter and accordingly, in the second mode, the voltage on the electric power feeding line can be decreased without causing a short circuit path to be formed between the main power storage device and the sub power storage device. Therefore, in the second mode, the switching loss of the first voltage converter is decreased so that the energy efficiency of the electrically powered vehicle can be enhanced.

Advantageous Effects of Invention

According to the present invention, in a power supply system for an electrically powered vehicle configured to include a main power storage device and a plurality of sub power storage devices and share a Voltage converter (converter) by the plurality of sub power storage devices, the last available sub power storage device whose use has come to an end can be disconnected at an appropriate timing with both of battery protection and vehicle's ensured drivability taken into consideration.

DESCRIPTION OF EMBODIMENTS

Figure 1:
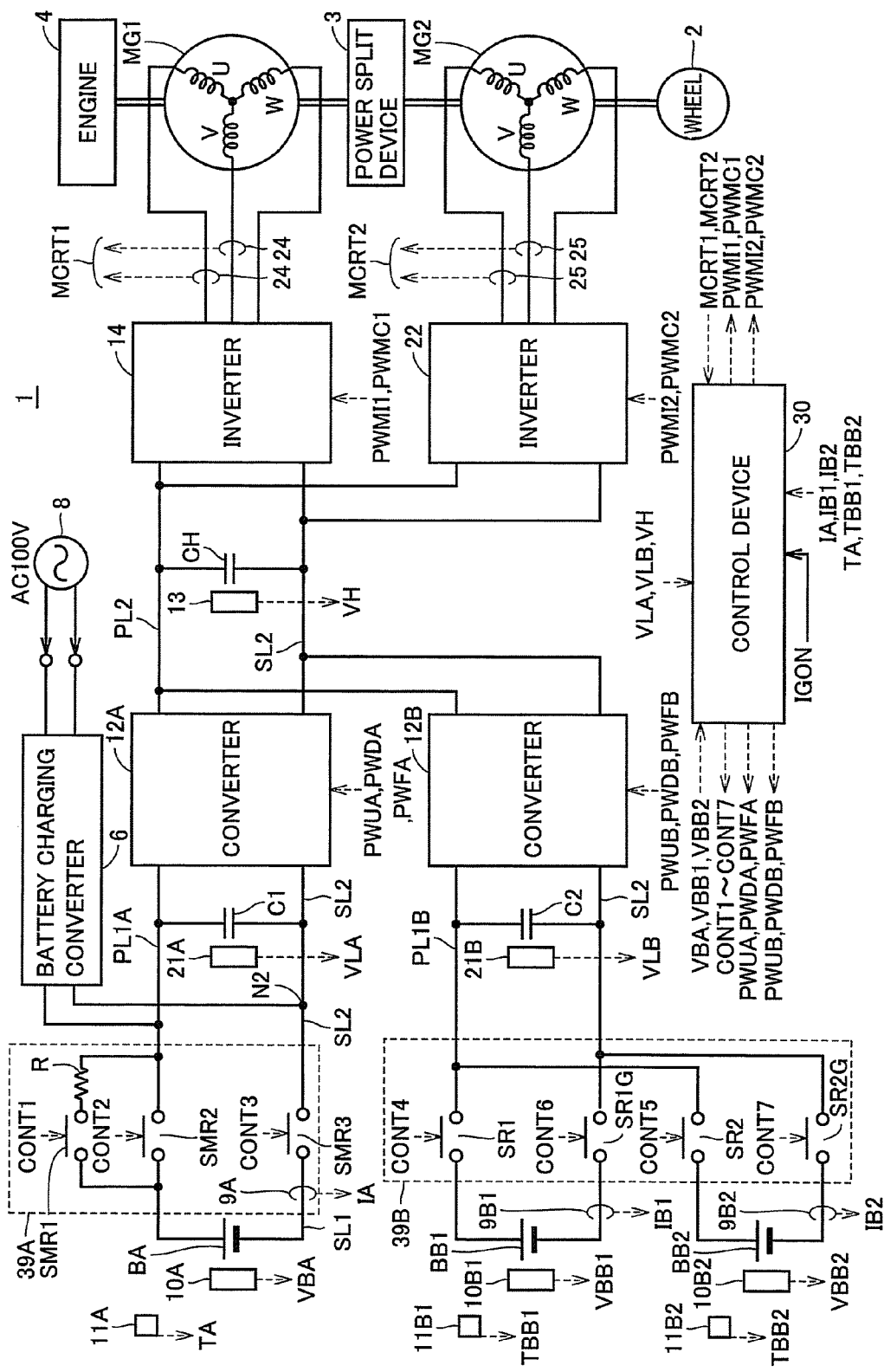
FIG. 1 shows a main configuration of an electrically powered vehicle mounted with a power supply system in an embodiment of the present invention.

Embodiments of the present invention will be hereinafter described in detail with reference to the drawings. In the drawings, like or corresponding components are denoted by like reference characters, and a description thereof will not be repeated in principle.

FIG. 1 shows a main configuration of an electrically powered vehicle mounted with a power supply system in an embodiment of the present invention.

With reference to FIG. 1, an electrically powered vehicle 1 includes power storage devices implemented as batteries BA, BB1, BB2, connection units 39A, 39B, converters 12A, 12B, smoothing capacitors C1, C2, CH, voltage sensors 10A, 10B1, 10B2, 13, 21A, 21B, temperature sensors 11A, 11B1, 11B2, current sensors 9A, 9B1, 9B2, an electric power feeding line PL2, inverters 14, 22, motor generators MG1, MG2, a wheel 2, a power split device 3, an engine 4, and a control device 30.

A power supply system for an electrically powered vehicle illustrated in connection with the present embodiment includes a main power storage device implemented as battery BA, electric power feeding line PL2 supplying electric power to inverter 14 driving motor generator MG2, converter 12A provided between the main power storage device (BA) and electric power feeding line PL2 to serve as a voltage converter converting voltage bidirectionally, batteries BB1, BB2 implementing a plurality of sub power storage devices provided in parallel with each other, and converter 12B provided between the plurality of sub power storage devices (BB1, BB2) and electric power feeding line PL2 to serve as a voltage converter converting voltage bidirectionally. The voltage converter (12B) is connected selectively to one of the plurality of sub power storage devices (BB1, BB2) to convert voltage between the connected sub power storage device and electric power feeding line PL2 bidirectionally.

A sub power storage device (one of BB1 and BB2) and the main power storage device (BA) have their storable capacity set so that for example when they are concurrently used they can output maximum power tolerated for an electric load (22 and MG2) connected to the electric power feeding line. This allows the vehicle without using the engine, namely traveling as an EV, to travel with maximum power. If the sub power storage device's state of charge is decreased, the sub power storage device can be exchanged so that the vehicle can further travel. If the sub power storage devices' electric power has completely been consumed, then, in addition to the main power storage device, the engine can be used to allow the vehicle to travel with maximum power without using the sub power storage device.

Furthermore, such a configuration allows converter 12B to be shared between the plurality of sub power storage devices. This can eliminate the necessity of increasing the number of converters to be equal to that of power storage devices. For a further increased EV travelable distance, an additional battery can be introduced in parallel with batteries BB1, BB2.

Preferably, the main power storage device and sub power storage devices mounted on this electrically powered vehicle are externally chargeable. For this purpose, electrically powered vehicle 1 further includes a battery charging device (charging converter) 6 to be connected to an external power supply 8 that is for example a commercial power supply of AC 100 V. Battery charging device 6 converts alternating current to direct current and also adjusts voltage to supply electric power for charging a battery. The configuration that enables external charging may be the above-described one, or a system connecting a neutral point of a stator coil of motor generator MG1, MG2 to an AC power supply or a system using converters 12A, 12B that function together as an AC to DC conversion device may also be used to enable external charging.

Smoothing capacitor C1 is connected between a power supply line PL1A and a ground line SL2. Voltage sensor 21A senses voltage VLA across smoothing capacitor C1 and outputs it to control device 30. Converter 12A can step up voltage across smoothing capacitor C1 and supply it to electric power feeding line PL2.

Smoothing capacitor C2 is connected between a power supply line PL1B and ground line SL2. Voltage sensor 21B senses voltage VLB across smoothing capacitor C2 and outputs it to control device 30. Converter 12B can step up voltage across smoothing capacitor C2 and supply it to electric power feeding line PL2.

Smoothing capacitor CH smoothes the voltage stepped up by converter 12A, 12B. Voltage sensor 13 senses voltage VH across smoothing capacitor CH and outputs it to control device 30.

Alternatively, in an opposite direction, converters 12A, 12B can step down voltage VH smoothed by smoothing capacitor CH and supply it to power supply lines PL1A, PL1B.

Inverter 14 receives DC voltage supplied from converter 12B and/or 12A, converts it to three-phase AC voltage, and outputs it to motor generator MG1. Inverter 22 receives DC voltage supplied from converter 12B and/or 12A, converts it to three-phase AC voltage, and outputs it to motor generator MG2.

Power split device 3 is a mechanism coupled to engine 4 and motor generators MG1, MG2 to distribute power therebetween. The power split device can for example be a planetary gear mechanism having the three shafts of rotation of a sun gear, a planetary carrier and a ring gear. In the planetary gear mechanism, when two of the three shafts of rotation have their rotation determined, that of the other one shaft of rotation is compulsively determined. These three shafts of rotation are connected to engine 4 and motor generators MG1, MG2 at their respective shafts of rotation, respectively. Motor generator MG2 has its shaft of rotation coupled to wheel 2 by a reduction gear, a differential gear or the like (not shown).

Furthermore, power split device 3 may further have a speed reducer incorporated therein for the shaft of rotation of motor generator MG2.

Connection unit 39A includes a system main relay SMR2 connected between the positive electrode of battery BA and power supply line PL1A, a system main relay SMR1 and a limiting resistor R connected in series and connected in parallel with system main relay SMR2, and a system main relay SMR3 connected between the negative electrode of battery BA (ground line SL1) and a node N2.

System main relays SMR1 to SMR3 have their conduction (on)/non-conduction (off) states controlled by relay control signals CONT1 to CONT3, respectively, issued from control device 30.

Voltage sensor 10A measures voltage VA across battery BA. Further, temperature sensor 11A measures temperature TA of battery BA, and current sensor 9A measures current IA input/output to/from battery BA. The measurements obtained by these sensors are output to control device 30.

Based on these measurements, control device 30 monitors the state of battery BA that is represented by the state of charge (SOC).

Connection unit 39B is provided between power supply line PL1B and ground line SL2, and batteries BB1, BB2. Connection unit 39B includes a relay SR1 connected between the positive electrode of battery BB1 and power supply line PL1B, a relay SR1G connected between the negative electrode of battery BB1 and ground line SL2, a relay SR2 connected between the positive electrode of battery BB2 and power supply line PL1B, and a relay SR2G connected between the negative electrode of battery BB2 and ground line SL2.

Relays SR1, SR2 have their conduction (on)/non-conduction (off) states controlled by relay control signals CONT4, CONT5, respectively, issued from control device 30. Relays SR1G, SR2G have their conduction (on)/non-conduction (off) states controlled by relay control signals CONT6, CONT7, respectively, issued from control device 30. Ground line SL2 extends through converters 12A, 12B toward inverters 14 and 22, as will be described later.

Voltage sensors 10B1 and 10B2 measure voltages VBB1 and VBB2 across batteries BB1 and BB2, respectively. Temperature sensors 11B1 and 11B2 measure temperatures TBB1 and TBB2 of batteries BB1 and BB2, respectively. Current sensors 9B1 and 9B2 measure currents IB1 and IB2 input/output to/from batteries BB1 and BB2, respectively. These sensors' measurements are output to control device 30. Based on these measurements, control device 30 monitors the states of batteries BB1, BB2 represented by the state of charge (SOC).

Battery BA, BB1, BB2 can for example be a lead-acid battery, a nickel-metal hydride battery, a lithium ion battery or a similar secondary battery, an electric double layer capacitor or a similar large-capacitance capacitor, or the like.

Inverter 14 is connected to electric power feeding line PL2 and ground line SL2. Inverter 14 receives the stepped-up voltage from converter 12A and/or converter 12B, and drives motor generator MG1 for example to start engine 4. Furthermore, inverter 14 returns to converters 12A and 12B the electric power generated by motor generator MG1 by the power transmitted from engine 4. At this time, converters 12A and 12B are controlled by control device 30 to operate as voltage step down converters.

Current sensor 24 senses a current that flows to motor generator MG1 as a motor current value MCRT1, and outputs motor current value MCRT1 to control device 30.

Inverter 22 is connected to electric power feeding line PL2 and ground line SL2 in parallel with inverter 14. Inverter 22 receives DC voltage from converters 12A and 12B, converts it to three-phase AC voltage, and outputs it to motor generator MG2 for driving wheel 2. Furthermore, inverter 22 returns to converters 12A and 12B the electric power generated by motor generator MG2 as the vehicle is regeneratively braked. At this time, converters 12A and 12B are controlled by control device 30 to operate as voltage step down converters.

Current sensor 25 senses a current that flows to motor generator MG2 as a motor current value MCRT2, and outputs motor current value MCRT2 to control device 30.

Control device 30 is constituted by an electronic control unit (ECU) having a central processing unit (CPU) and a memory (not shown) incorporated therein, and in accordance with a map and a program stored in the memory, uses each sensor's measurement to perform an operation process. Control device 30 may have a portion configured to allow an electronic circuit or similar hardware to perform predetermined arithmetic and logical operations.

More specifically, control device 30 receives torque command values for motor generators MG1, MG2, respectively, the motor generators' respective rotation speeds, respective values of voltages VBA, VBB1, VBB2, VLA, VLB, VH, motor current values MCRT1, MCRT2, and a start signal IGON to control converters 12A, 12B and inverters 14, 22.

Control device 30 outputs to converters 12A, 12B control signals PWUA, PWUB for instructing the converters to step up voltage, control signals PWDA, PWDB for instructing the converters to step down voltage, control signals PWFA, PWFB for instructing the converters to hold voltage, and a shutdown signal (not shown) for giving an instruction so that operation is prohibited.

Furthermore, control device 30 outputs to inverter 14 a control signal PWMI1 for instructing inverter 14 to convert DC voltage output from converters 12A, 12B to AC voltage for driving motor generator MG1, and a control signal PWMC1 for instructing inverter 14 to convert AC voltage generated by motor generator MG1 to DC voltage and return it toward converters 12A, 12B for regeneration.

Similarly, control device 30 outputs to inverter 22 a control signal PWMI2 for instructing inverter 22 to convert DC voltage to AC voltage for driving motor generator MG2, and a control signal PWMC2 for instructing inverter 22 to convert AC voltage generated by motor generator MG2 to DC voltage and return it toward converters 12A, 12B for regeneration.

Figure 2:
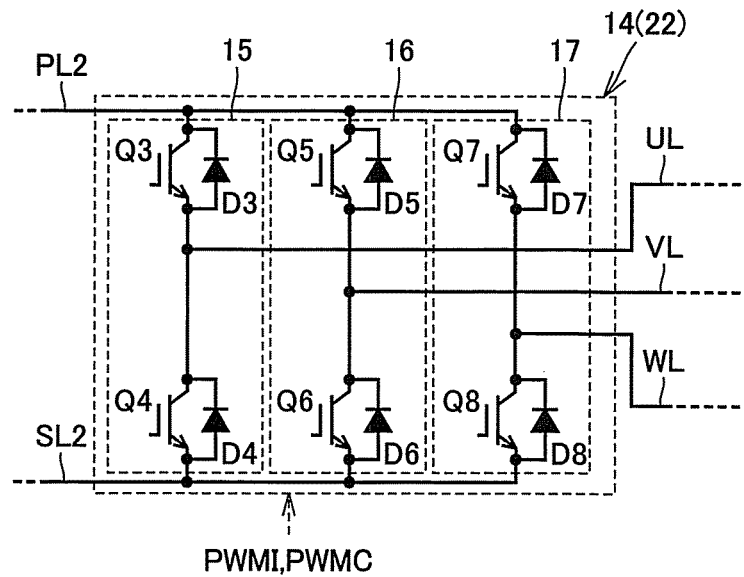
FIG. 2 is a circuit diagram showing in detail a configuration of each inverter shown in FIG. 1.

FIG. 2 is a circuit diagram showing in detail a configuration of inverters 14 and 22 shown in FIG. 1.

With reference to FIG. 2, inverter 14 includes a U phase arm 15, a V phase arm 16 and a W phase arm 17. U phase arm 15, V phase arm 16 and W phase arm 17 are connected in parallel between electric power feeding line PL2 and ground line SL2.

U phase arm 15 includes insulated gate bipolar transistor (IGBT) devices Q3, Q4 connected in series between electric power feeding line PL2 and ground line SL2, IGBT devices Q3, Q4, and their respective anti-parallel diodes D3, D4. Diode D3 has its cathode connected to IGBT device Q3 at the collector, and its anode to IGBT device Q3 at the emitter. Diode D4 has its cathode connected to IGBT device Q4 at the collector and its anode to IGBT device Q4 at the emitter.

V phase arm 16 includes IGBT devices Q5, Q6 connected in series between electric power feeding line PL2 and ground line SL2, and their respective anti-parallel diodes D5, D6. IGBT devices Q5, Q6 and anti-parallel diodes D5, D6 are connected similarly as done in U phase arm 15.

W phase arm 17 includes IGBT devices Q7, Q8 connected in series between electric power feeding line PL2 and ground line SL2, and their respective anti-parallel diodes D7, D8. IGBT devices Q7, Q8 and anti-parallel diodes D7, D8 are also connected similarly as done in U phase arm 15.

In the present embodiment, an IGBT device is indicated as a representative example of a power semiconductor switching element controllable to be turned on/off. In other words, the IGBT device may be replaced with a bipolar transistor, a field effect transistor or a similar power semiconductor switching element.

Each phase arm has an intermediate point connected to motor generator MG at each phase coil at each phase end. In other words, motor generator MG1 is a three-phase permanent magnet synchronous motor and the three U, V, W phase coils each have one end connected together to an intermediate point. The U phase coil has the other end connected to a line UL drawn from a connection node of IGBT devices Q3, Q4. The V phase coil has the other end connected to a line VL drawn from a connection node of IGBT devices Q5, Q6. The W phase coil has the other end connected to a line WL drawn from a connection node of IGBT devices Q7, Q8.

Inverter 22 shown in FIG. 1 is different in that it is connected to motor generator MG2. However, its internal circuit configuration is similar to inverter 14. Accordingly it will not be described repeatedly in detail. Furthermore, FIG. 2 shows an inverter receiving control signals PWMI, PWMC. This is to avoid complexity. Specifically, as shown in FIG. 1, different control signals PWMI1, PWMC1 and control signals PWMI2, PWMC2 are input to inverters 14, 22, respectively.

Figure 3:
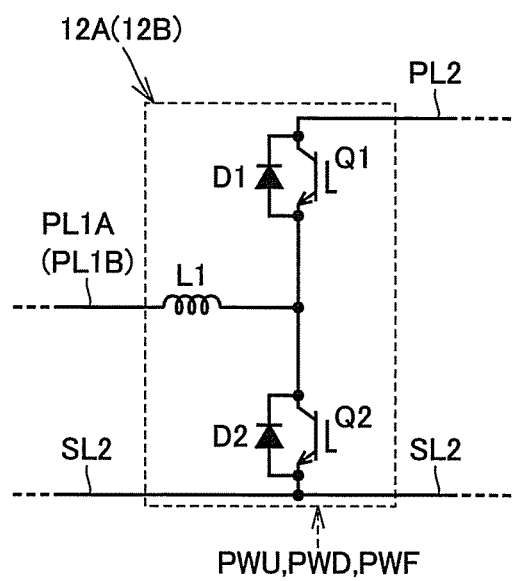
FIG. 3 is a circuit diagram showing in detail a configuration of each converter shown in FIG. 1.

FIG. 3 is a circuit diagram showing in detail a configuration of converters 12A and 12B shown in FIG. 1.

With reference to FIG. 3, converter 12A includes a reactor L1 having one end connected to power supply line PL1A, IGBT devices Q1, Q2 connected in series between electric power feeding line PL2 and ground line SL2, and their respective anti-parallel diodes D1, D2.

Reactor L1 has the other end connected to IGBT device Q1 at the emitter and to IGBT device Q2 at the collector. Diode D1 has its cathode connected to IGBT device Q1 at the collector and its anode to IGBT device Q1 at the emitter.

Converter 12B shown in FIG. 1 is different from converter 12A in that the former is not connected to power supply line PL1A and instead to power supply line PL1B. Its internal circuit configuration is, however, similar to converter 12A, and therefore, a detailed description thereof will not be repeated. Further, FIG. 3 shows the converter receiving control signals PWU, PWD, PWF, which is for the sake of avoiding complexity. Specifically, as shown in FIG. 1, different control signals PWUA, PWDA, PWFA and control signals PWUB, PWDB, PWF are input to converters 12A and 12B, respectively.

Converters 12A, 12B have IGBT devices Q1, Q2 switched as (or have a duty) controlled by control signals PWUA, PWUB to step up DC voltages VLA, VLB and thereby generate DC voltage VH on electric power feeding line PL2. Converters 12A, 12B have IGBT devices Q1, Q2 switched as controlled by control signals PWDA, PWDB to step down DC voltage VH on electric power feeding line PL2 and thereby supply it to batteries BA, BB. Converters 12A, 12B are thus configured to be capable of converting electric power bidirectionally to control a voltage conversion ratio VH/VLA (or VH/VLB). Furthermore, converters 12A, 12B can also operate in response to control signals PWFA, PWFB to hold on switching device Q1 (upper arm) (a lower arm, or switching device Q2, is held off) to hold VH=VLA (or VH=VLB).

When the voltage is stepped up and stepped down, IGBT devices Q1, Q2 are switched (or turned on/off) as controlled in accordance with a constant switching frequency, and thus electric power loss is generated. In contrast, when voltage is held (or the upper arm is held on), the IGBT devices are not turned on and off. At this time, electric power loss is not generated, and the converters' efficiency and hence the mileage of electrically powered vehicle 1 are relatively improved.

Again with reference to FIG. 1, in the power supply system for electrically powered vehicle 1, a parallel battery mode (first mode) is basically selected. The parallel battery mode allows battery BA (main power storage device) and a sub power storage device selected from batteries BB1, BB2 (hereinafter also referred to as "selected sub power storage device BB") to be used in parallel. In the parallel battery mode, battery BA and selected sub power storage device BB, and motor generators MG1, MG2 provide and receive electric power therebetween.

Control device 30 receives sensed values from voltage sensor 10A, temperature sensor 11A and current sensor 9A, and in accordance therewith sets an SOC(M) indicating the main power storage device's residual capacity, an upper limit on electric power input Win(M) indicating an upper limit value of electric power charged thereto, and an upper limit on electric power output Wout(M) indicating an upper limit value of electric power discharged therefrom.

Furthermore, control device 30 receives sensed values from voltage sensors 10B1, 10B2, temperature sensors 11B1, 11B2 and current sensors 9B1, 9B2 and in accordance therewith sets an SOC(B) of selected sub power storage device BB and upper limits on electric power input and output Win(S) and Wout(S) thereto and therefrom, respectively.

Generally, an SOC is indicated by a ratio (%) of each battery's currently charged amount to its fully charged state. Furthermore, Win, Wout are indicated as such an upper limit value of electric power that, when that electric power of the upper limit value is discharged for a predetermined period of time (for approximately 10 seconds for example), the battery of interest (BA, BB1, BB2) is not overcharged/overdischarged.

In the parallel battery mode, the electric power of selected sub power storage device BB, rather than battery BA, is preferentially used. When the electric power stored in selected sub power storage device BB is completely consumed, connection unit 39B has its internal relays switched on/off to switch selected sub power storage device BB to another. In the case where the last one of the sub power storage devices (batteries BB1, BB2) is used as selected sub power storage device BB, namely where there is no available sub power storage device left, when currently selected sub power storage device BB's electric power is completely consumed, all sub power storage devices BB1, BB2 are electrically disconnected from the power supply system, so that a single battery mode (second mode) is applied in which only main power storage device BA is used as a power supply.

More specifically, in the single battery mode, connection unit 39B has its internal relays each turned off to mechanically break a conduction path between batteries BB1, BB2 and electric power feeding line PL2. This eliminates a possibility that a conduction path is formed between batteries BB1, BB2 and battery BA.

It is understood from FIGS. 1 and 3 that in the parallel battery mode it is necessary that electric power feeding line PL2 has voltage VH at least higher than the voltage output from battery BA and the voltage output from selected sub power storage device BB to prevent a short circuit path from being formed between battery BA and batteries BB1, BB2.

Further wore, the lower limit value of voltage VH on electric power feeding line PL2 is also restricted in view of control of motor generators MG1, MG2. More specifically, in view of motor control, it is preferable that voltage VH be higher than the induced voltage of motor generators MG1, MG2. Accordingly, in effect, voltage VH is controlled to be higher than both a lower limit value set in view of the restriction relevant to the batteries and a lower limit value set in view of the motor control.

Accordingly, in the parallel battery mode, when voltage VH may be reduced in view of the motor control, typically when it is not necessary that converters 12A, 12B step up voltage, it is still necessary to cause converters 12A, 12B to perform a voltage step up operation to satisfy the lower limit value set in view of the restriction relevant to the batteries.

Even after both of batteries BB1 and BB2, namely all sub power storage devices have been exhausted, if the relay maintains connection, there is a possibility that a short circuit path is formed between battery BA and battery BB1, BB2 through diode D1 of converter 12B and electric power feeding line PL2. Accordingly, in the power supply system of the present embodiment, when there is no available sub power storage device, the power supply system shifts to the single battery mode to electrically disconnect all of the sub power storage devices from the power supply system.

This can eliminate the necessity of stepping up voltage in view of the restriction relevant to the batteries, and when it is not necessary in view of motor control that converter 12A steps up voltage, converter 12A can be operated in a voltage holding mode to reduce an electric power loss caused at converter 12A.

Figure 4:
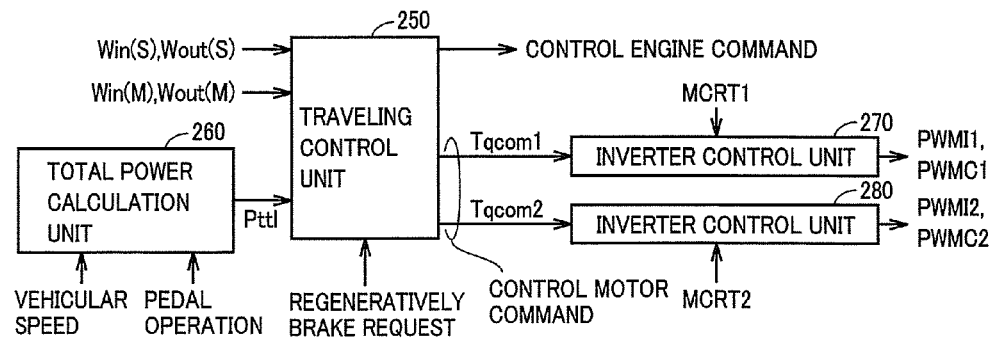
FIG. 4 is a functional block diagram for illustrating how traveling of an electrically powered vehicle is controlled.

FIG. 4 is a functional block diagram for illustrating how control device 30 controls traveling of electrically powered vehicle 1, more specifically, a configuration for power distribution control between engine 4 and motor generators MG1, MG2.

FIG. 4 shows functional blocks that are implemented by control device 30 through execution of a predetermined program stored in advance and/or operation performed by electronic circuitry (hardware) in control device 30.

With reference to FIG. 4, a total power calculation unit 260 calculates total power Ptt1 required for the entirety of electrically powered vehicle 1 from vehicular speed and operation of a pedal (accelerator pedal). Total required power Ptt1 may also include power required (engine's output), depending on the vehicle's condition, for generating electric power by motor generator MG1 to charge a battery.

A traveling control unit 250 receives the upper limits on electric power input and output Win(M) and Wout(M) to and from main power storage device BA, the upper limits on electric power input and output Win(S) and Wout(S) to and from a selected sub power storage device BB, total required power Ptt1 from total power calculation unit 260, and a regenerative brake request made when the brake pedal is operated. Traveling control unit 250 generates torque command values Tqcom1 and Tqcom2 as motor control commands, so that the total input and output electric power of motor generators MG1 and MG2 falls within the total charging limit (Win(M)+Win(S)) and the total discharging limit (Wout(M)+Wout(S)) for main power storage device BA and selected sub power storage device BB.

Furthermore, to ensure total required power Ptt1, it is assigned between power provided by motor generator MG2 to drive the vehicle and that provided by engine 4 to do so. In particular, an externally charged battery's electric power is maximally utilized to restrict the operation of engine 4, or the power provided by engine 4 to drive the vehicle is set to correspond to a range allowing engine 4 to be highly efficiently operable, so that the vehicle is controlled to travel with high fuel-efficiency.

An inverter control unit 270 receives torque command value Tqcom1 and motor current value MCRT1 of motor generator MG1 and therefrom generates control signals PWMI1, PWMC1 for inverter 14. Similarly an inverter control unit 280 receives torque command value Tqcom2 and motor current value MCRT2 of motor generator MG2 and therefrom generates control signals PWMI2, PWMC2 for inverter 22. Furthermore, traveling control unit 250 generates a control engine command in accordance with a value requested of power provided by the engine to drive the vehicle, as set. Furthermore, a control device (engine ECU) (not shown) controls the operation of engine 4 in accordance with the control engine command.

When the battery electric power is actively used for the vehicle to travel (EV mode) and total required power Ptt1 is equal to or smaller than the total upper limit on electric power output Wout(M)+Wout(S) of the batteries, control device 30 does not cause engine 4 to operate so that the vehicle travels with only the driving power generated by motor generator MG2. When total required power Ptt1 exceeds Wout(M)+Wout(S), engine 4 is started.

In contrast, when the EV mode is not selected, namely when the vehicle is traveling in an HV mode, control device 30 controls distribution of driving power between engine 4 and motor generator MG2 to maintain the batteries' SOC at a predetermined target value. In other words, the vehicle is controlled to travel in such a state where engine 4 is more likely to be actuated as compared with the EV mode.

Here, in the case as described above where the last one of the sub power storage devices is used as selected sub power storage device BB, namely where there is no available sub power storage device left, when the current sub power storage device BB's SOC is decreased, it is necessary to shift to the single battery mode. Hereinafter, a determination on whether to shift from the parallel battery mode to the single battery mode will also be referred to as disconnection determination. Furthermore, a request generated in accordance with the disconnection determination to shift from the parallel battery mode to the single battery mode will also be referred to as disconnection request.

Regarding the disconnection determination, it is necessary, in terms of battery protection, to surely make disconnection before an overdischarged state is reached. It is also necessary to take the disconnection timing into consideration so as to avoid influence on the vehicle's drivability while the disconnection process is performed.

Figure 5:
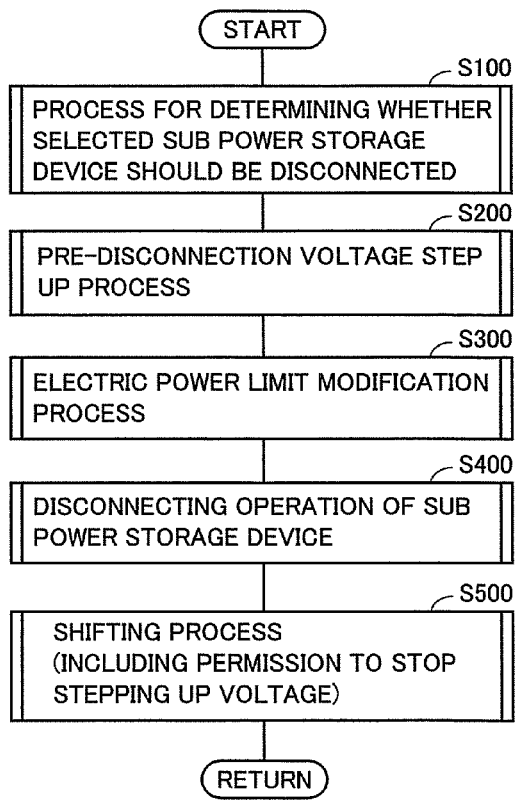
FIG. 5 is a flowchart of a general procedure of a process performed to disconnect a selected sub power storage device in a power supply system for an electrically powered vehicle in an embodiment of the present invention.

FIG. 5 shows a flowchart of a general procedure of a process for disconnecting a selected sub power storage device in a power supply system for an electrically powered vehicle in an embodiment of the present invention. FIG. 6 and FIGS. 8 to 11 show flowcharts for illustrating in detail steps S100, S200, S300, S400, and S500 of FIG. 5.

Control device 30 can execute a previously stored, predetermined program periodically, as predetermined, to repeatedly perform a control process procedure in accordance with the flowcharts indicated in FIGS. 5, 6 and 8 to 11, periodically as predetermined. In this way, the disconnection process can be implemented for disconnecting a sub power storage device in a power supply system of an electrically powered vehicle in an embodiment of the present invention.

With reference to FIG. 5, control device 30 performs in step S100 a process for determining whether a selected sub power storage device should be disconnected. When control device 30 determines that it is necessary to disconnect the selected sub power storage device, the following steps S200 to S500 are performed. When control device 30 determines in step S100 that it is not necessary to disconnect the selected sub power storage device, steps S200 to S500 are substantially not performed.

Control device 30 performs in step S200 a pre-disconnection voltage step up process and performs in step S300 an electric power limit modification process so that a request for excessive charging or discharging will not be made to the power supply system during the process for disconnecting the sub power storage device. Then, control device 30 performs in step S400 disconnecting operation for electrically disconnecting all sub power storage devices (batteries BB1, BB2) including selected sub power storage device BB from the power supply system. After disconnection is completed, a shifting process is performed in step S500 so as to start supply of electric power in the single battery mode in which only battery BA is used.

Figure 6:
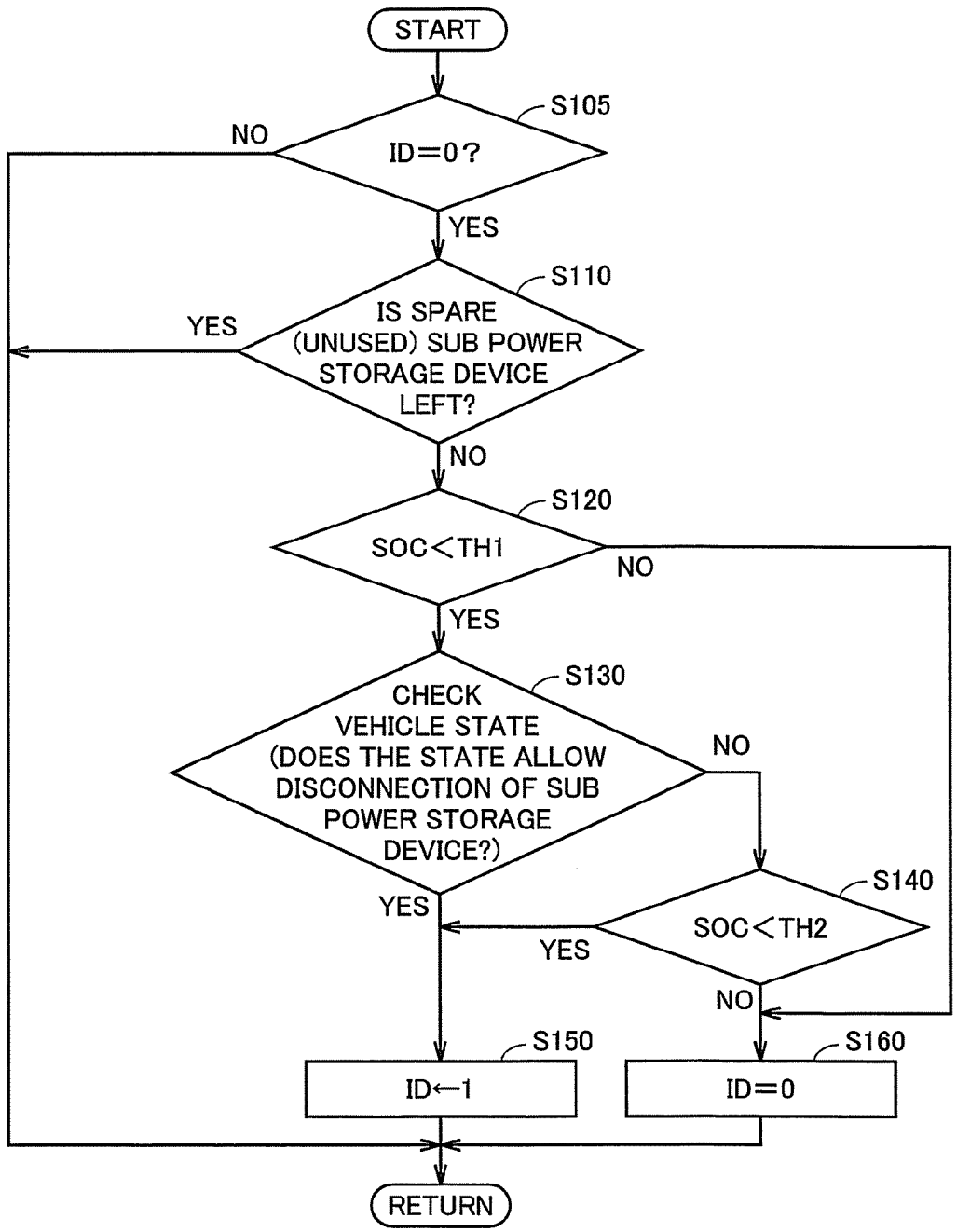
FIG. 6 is a flowchart for illustrating in detail a process performed to determine whether a sub power storage device should be disconnected, as shown in FIG. 5.

FIG. 6 is a flowchart for illustrating in detail the process performed to determine whether a selected sub power storage device should be disconnected (S100) as shown in FIG. 5.

As will be described hereinafter, a variable ID representing the progress (status) of the disconnection process is introduced. ID is set to any of −1 and 0 to 4. ID=0 represents a status where the parallel battery mode is applied and the disconnection request has not been generated. Namely, when the variable is ID=0, it is determined periodically as predetermined whether the battery mode should be shifted to the single battery mode, namely whether selected sub power storage device BB should be disconnected.

It should be noted that whether to shift the battery mode to the single battery mode or not may be determined, when the power supply system is activated, depending on for example the equipment failure or battery state. When it is accordingly determined that the single battery mode will not be applied, the variable is fixed at ID=−1 until the power supply system is stopped.

With reference to FIG. 6, control device 30 determines in step S105 whether the variable is ID=0. When the variable is ID=0 (YES in S105), control device 30 starts the substantial process for determining whether disconnection should be made.

Initially, control device 30 determines in step S110 whether an available sub power storage device is left other than selected sub power storage device BB as currently used, so as to replace the currently used sub power storage device. When a spare sub power storage device is left (YES in S110), the parallel battery mode will continue even when currently selected sub power storage device BB has been exhausted and therefore, the subsequent steps in the disconnection determination process (step S120 and following steps) will not be performed.

In contrast, when the determination in step S110 is NO, namely there is no available sub power storage device left and the last one sub power storage device is used as selected sub power storage device BB, control device 30 further proceed with the process for determining whether disconnection should be made.

Control device 30 determines in step S120 whether the SOC of selected sub power storage device BB falls below a reference value TH1. When there is a relation of SOC<TH1 (YES in S120), control device 30 determines in step S130 whether electrically powered vehicle 1 is in such a state that the sub power storage device can be disconnected.

The determination in step S130 is made based on for example total required power Ptt1 of the vehicle. In the process for disconnecting a sub power storage device, electric power is unavailable from the sub power storage device and therefore, the electric power available from the power supply system as a whole decreases. Thus, if the disconnection process is performed when total required power Ptt1 of the vehicle is large, electric power is required for starting engine 4 and accordingly the output power of motor generator MG2 decreases. In such a case, an immediate response to a driver's request may be impossible. In other words, if the process for disconnecting a sub power storage device is executed while the vehicle is in such a state, the process may affect the vehicle's drivability.

As such, when the total required power of the vehicle is smaller than a reference value, it can be determined that the vehicle is in the state where total required power Ptt1 can be fulfilled even if the process for disconnecting the sub power storage device is executed, namely the vehicle is in such a state that the process for disconnecting the sub power storage device can be executed (YES in step S130). Whether it is necessary to start engine 4 is determined depending on whether total required power Ptt1 can be fulfilled by the upper limit on electric power output Wout(M) of main sub power storage device BA. Therefore, the above-described reference value may preferably be variable depending on the upper limit on electric power output Wout(M) of main power storage device BA.

Alternatively, from a similar standpoint, it can be determined as well, when a driver shifts gears to select the parking (P) range or neutral (N) range, that the vehicle is in such a state that total required power Ptt1 can be fulfilled even if the process for disconnecting a sub power storage device is executed, because total required power Ptt1 for the parking and neutral ranges is small by nature.

Further, for the hybrid vehicle shown in FIG. 1, as long as engine 4 has been activated, total required power Ptt1 that is increased for example in response to driver's operation of the accelerator pedal can be fulfilled immediately by increasing the output power of engine 4. Therefore, based on whether engine 4 is operating (has been started), the determination in step S130 may also be made. Specifically, as long as engine 4 is operating, the determination in step S130 may be YES.

For example, when it is determined that the vehicle is any of the above-described states where a sub power storage device can be disconnected (YES in S130), control device 30 proceeds to step S150 to set the variable to ID=1. Namely, ID=1 represents the status where the disconnection process is started in response to generation of a request to disconnect selected sub power storage device BB. In this way, in step S130, the disconnection request can be generated, based on the determination as to whether the vehicle state is such that total required power Ptt1 can be fulfilled even if the process for disconnecting the sub power storage device is executed, namely depending on the vehicle state relevant to the ability to fulfill total required power Ptt1.

In contrast, when it is determined that the vehicle state is not such that the sub power storage device can be disconnected (NO in S130), control device 30 proceeds to step S140 to determine whether the SOC of currently selected sub power storage device BB is smaller than a reference lower limit TH2. Preferably, this reference lower limit TH2 is set to a level at which each sub power storage device may have degraded battery performance due to overdischarging, for example, to a level with a margin with respect to the lower limit on the SOC determined in terms of control. Reference value TH1 is set to a level with an appropriate margin (approximately a few percent in SOC) with respect to reference lower limit TH2.

When the SOC of selected sub power storage device BB falls below reference lower limit TH2 (YES in S140), control device 30 sets the variable to ID=1 in step S150. Namely, in this case, the disconnection request is generated regardless of the result of determination (YES or NO in S130) as to the vehicle state relevant to the ability to fulfill total required power Ptt1.

In contrast, when there is a relation of SOC≥TH1 (NO in S120) or when there is a relation of TH2≤SOC<TH1 but the vehicle state is not such that the process for disconnecting the sub power storage device can be performed (YES in S140), control device 30 maintains ID=0 in step S160. Namely, the request to disconnect selected sub power storage device BB is not generated and the determination as to whether or not disconnection should be made in step S100 is performed again in the subsequent control cycle.

Once a relation of ID≥1 holds and accordingly the disconnection process is started, or when the variable is set to ID=−1 so that the single battery mode is not applied (NO in S105), steps S110 to S160 are skipped and the process for determining whether disconnection should be made will not substantially be performed.

Figure 7:
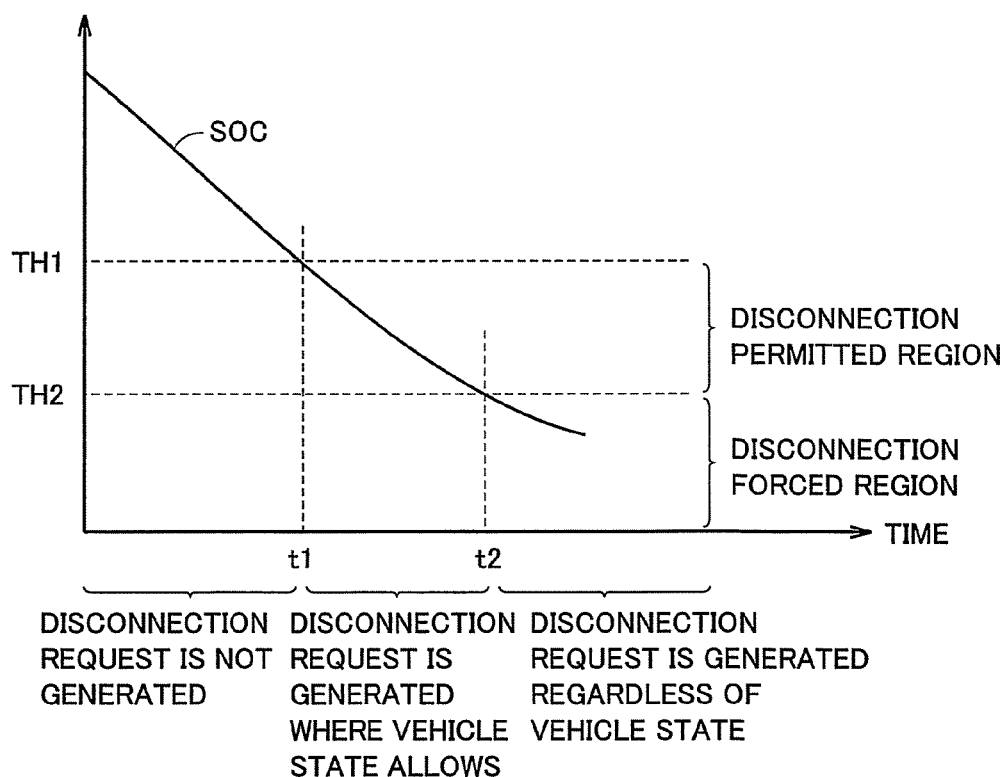
FIG. 7 is a conceptual diagram for illustrating a relation between SOC regions and determination as to disconnection.

FIG. 7 shows a conceptual diagram for a relation between the SOC of selected sub power storage device BB and the disconnection determination.

With reference to FIG. 7, the SOC of selected sub power storage device BB as used decreases to fall below reference value TH1 at time t1 and below reference lower limit TH2 at later time t2.

In the period to time t1 in which a relation of SOC≥TH1 holds, the disconnection request is not generated. The region from time t1 to time t2 in which a relation of TH2≤SOC<TH1 holds corresponds to "disconnection permitted region", and thus the disconnection request is generated as long as the vehicle state is appropriate, in accordance with the result of determination in step S130 of FIG. 6. The region from time t2 in which a relation of SOC<TH2 holds corresponds to "disconnection forced region" and, for the sake of battery protection, the disconnection request is generated regardless of the vehicle state (result of determination in S130).

As seen from above, in a power supply system for an electrically powered vehicle in an embodiment of the present invention, the disconnection determination for a plurality of sub power storage devices is made based on the SOC of selected sub power storage device BB with respect to two different levels.

Figure 8:
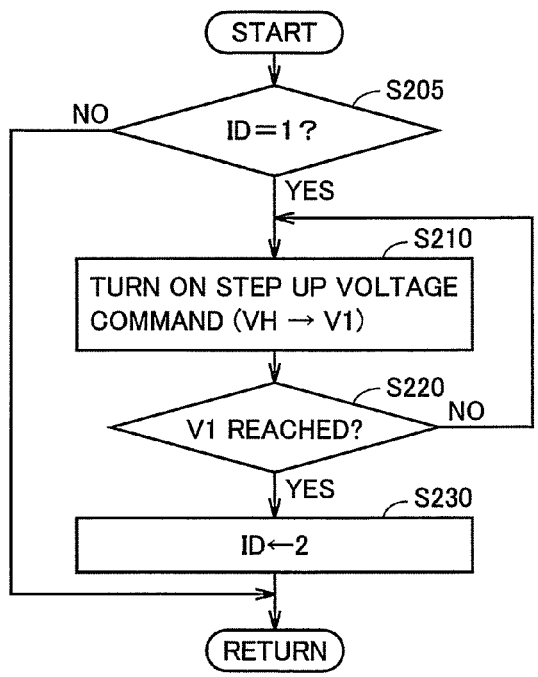
FIG. 8 is a flowchart for illustrating in detail a pre-disconnection voltage step up process shown in FIG. 5.

FIG. 8 is a flowchart for illustrating in detail the pre-disconnection voltage step up process (S200) shown in FIG. 5.

With reference to FIG. 8, control device 30 in the pre-disconnection voltage step up process confirms whether the variable is ID=1 in step S205. When the variable is ID=1 and the request to disconnect selected sub power storage device BB is made to start the disconnection process (YES in S205), control device 30 proceeds to step S210 to generate a command to converter 12A to step up voltage VH on electric power feeding line PL2 to a predetermined voltage V1. In response to the step up voltage command, a voltage command value VHref for electric power feeding line PL2 is set to be equal to V1, and to implement this voltage command value, control signal PWUA for converter 12A is generated.

Here, predetermined voltage V1 is set to a voltage higher than all of the output voltages of batteries BA, BB1, BB2. For example, predetermined voltage V1 is set to an upper limit control voltage VHmax to which the voltage can be stepped up by converter 12A to accordingly ensure that voltage VH when a step up voltage command is issued is higher than the higher one of the output voltages of batteries BA, BB1, BB2. Alternatively, in view of reducing a loss caused at converter 12A, predetermined voltage V1 may be determined depending on the output voltages of batteries BA, BB1, BB21 at the time, so that predetermined voltage V1 has a margin with respect to the highest one of these voltages.

When the step up voltage command is generated in step S210, control device 30 proceeds to step S220 to determine from a value as sensed by voltage sensor 13 whether voltage VH has reached predetermined voltage V1. The determination in step S220 is YES for example when VH≥V1 continues for a predetermined period of time.

Once voltage VH has reached predetermined voltage V1 (YES in S220), control device 30 changes ID from 1 to 2 in step S230. Until voltage VH reaches V1 (NO in S220), ID=1 is maintained. In other words, ID=2 represents a status where the pre-disconnection voltage step up process has ended and the disconnection process can be further continued. When the variable is ID≠1 (NO in S205), the subsequent steps S210 to S230 are skipped.

Figure 9:
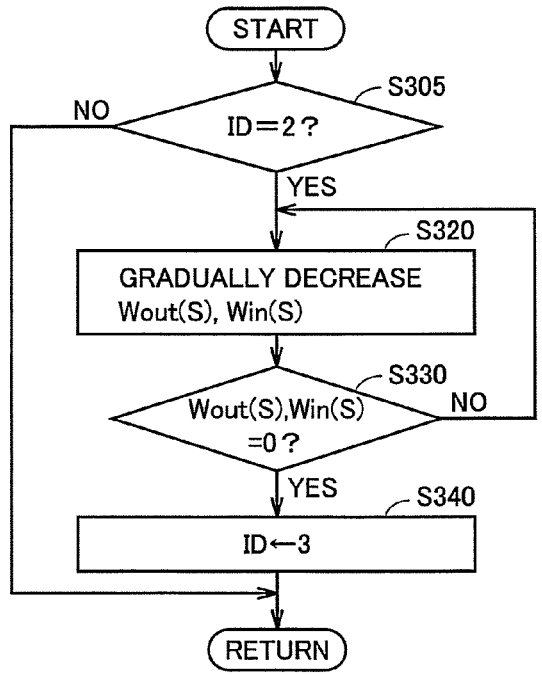
FIG. 9 is a flowchart for illustrating in detail an electric power limit modification process shown in FIG. 5.

Thus, when the pre-disconnection voltage step up process (step S200) has ended, control device 30 performs the electric power limit modification process shown in FIG. 9.

FIG. 9 is a flowchart for illustrating in detail the electric power limit modification process (S300) shown in FIG. 5.

With reference to FIG. 9, control device 30 in the electric power limit modification process initially proceeds to step S305 to determine whether the variable is ID=2. If not (NO in S305), the subsequent steps S320 to 340 are skipped.

When the variable is ID=2 (YES in S305), control device 30 proceeds to step S320 to gradually decrease the absolute values of the upper limits on electric power input and output Win(S) and Wout(S) of selected sub power storage device BB. For example, Win(S) and Wout(S) are gradually decreased toward 0 at a predetermined fixed rate.

Control device 30 proceeds to step S330 to determine whether Wout(S) and Win(S) have reached 0. Until a relation of Wout(S)=Win(S)=0 holds, step S320 is repeated to continuously decrease Wout(S) and Win(S).

Once Wout(S) and Win(S) have reached 0 (YES in S330), control device 30 proceeds to step S340 to further change ID from 2 to 3. In other words, ID=3 represents a status where the pre-disconnection voltage step up process and the electric power limit modification process have ended and actual disconnection between sub power storage devices BB1, BB2 and converter 12B can be started.

When the electric power limit modification process shown in FIG. 8 has ended, control device 30 proceeds to step S400 to perform the process for disconnecting a sub power storage device.

Figure 10:
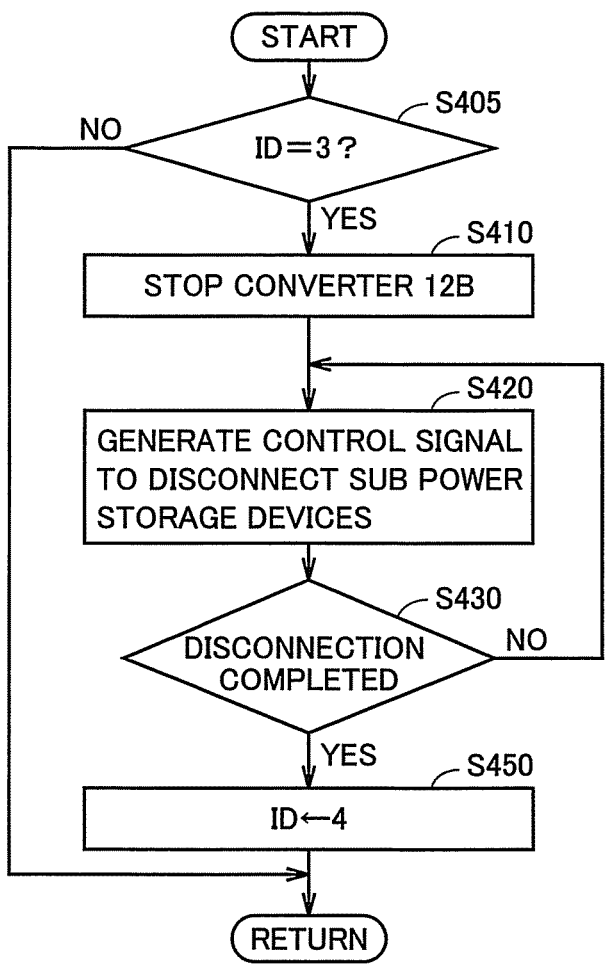
FIG. 10 is a flowchart for illustrating in detail a disconnection process shown in FIG. 5.

FIG. 10 is a flowchart for illustrating in detail the disconnecting operation for a sub power storage device (S400) shown in FIG. 5.

With reference to FIG. 10, control device 30 in disconnecting a sub power storage device first determines in step S405 whether the variable is ID=3. When the variable is ID≠3 (NO in S405), the subsequent steps are skipped.

When the variable is ID=3 (YES in S405), control device 30 stops converter 12B in step S410 in preparation for disconnection of the sub power storage device. Specifically, in converter 12B, IGBT devices Q1, Q2 are forced to turn off in response to a shut down command. Further, control device 30 generates in step S420 a relay control signal for disconnecting all sub power storage devices (batteries B1, B2) including selected sub power storage device BB from the power supply system. Namely, relay control signals CONT3 to CONT7 are generated so that relays SR1, SR1G, SR2, SR2G are each turned off.

Further, control device 30 determines in step S430 whether the relays have completely been turned off as instructed in step S420. When disconnection is completed through turn off of relays (YES in S430), control device 30 changes ID from 3 to 4 in step S450. Namely, ID=4 represents a status where all sub power storage devices have been disconnected.

When the disconnection in step S400 has ended, control device 30 performs a shifting process in step S500.

Figure 11:
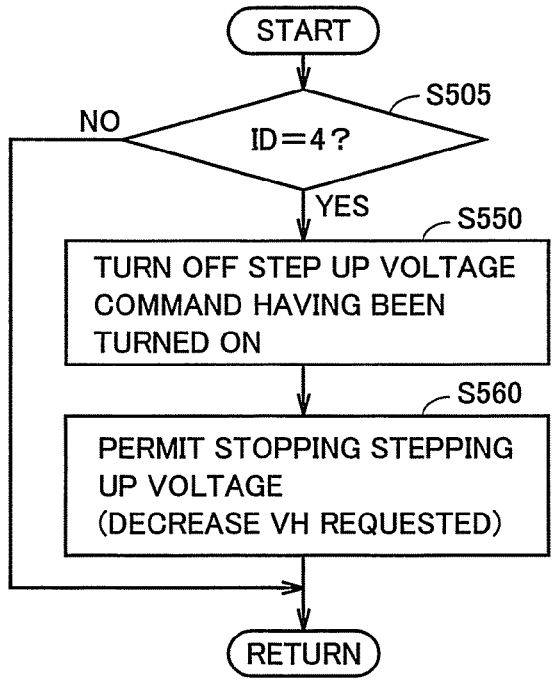
FIG. 11 is a flowchart for illustrating in detail a shifting process shown in FIG. 5.

FIG. 11 is a flowchart for illustrating in detail the shifting process (S500) shown in FIG. 5.

With reference to FIG. 11, control device 30 in the shifting process initially determines in step S505 whether the variable is ID=4. When the variable is ID≠4 (NO in S505), the following steps are skipped.

When the variable is ID=4 (YES in S505), control device 30 proceeds to step S550 to turn off the step up voltage command generated in step S210 (FIG. 8). The voltage command value for electric power feeding line PL2 is thus set to the value assumed before the step up voltage command is generated, more specifically, a value set in accordance with the states of motor generators MG1, MG2.

Figure 12:
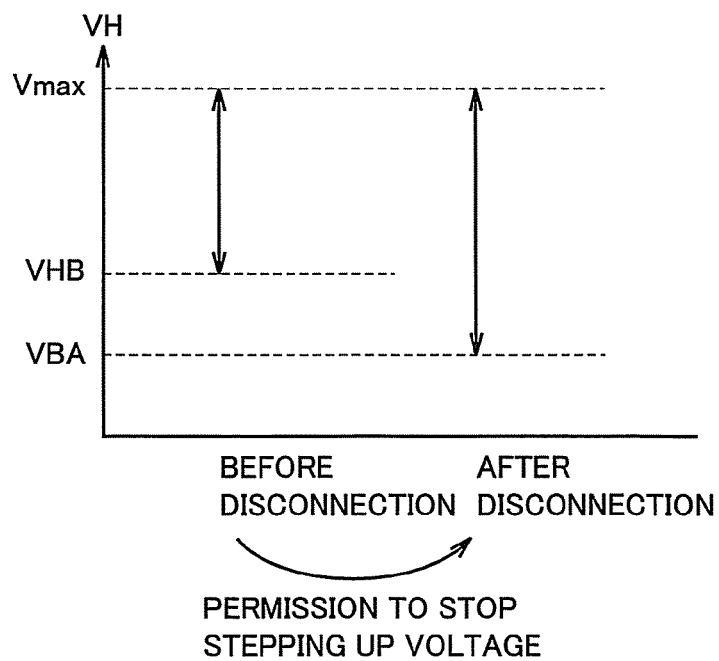
FIG. 12 is a conceptual diagram where voltage control ranges for an electric power feeding line before and after a disconnection process are compared.

Reference will now be made to FIG. 12 to compare voltage control ranges for electric power feeding line PL2 before and after the disconnection process.

With reference to FIG. 12, before the disconnection process, battery BA and selected sub power storage device BB are electrically connected to electric power feeding line PL2 and accordingly it is necessary for voltage VH on electric power feeding line PL2 to be higher than any of the output voltages of battery BA and selected sub power storage device BB. More specifically, voltage VH is controlled in a range having a lower limit value VHB set to a voltage at least higher than the highest one of the output voltages of battery BA and selected sub power storage device. BB, preferably a voltage higher than any of the output voltages of batteries BA, BB1, BB2.

In contrast, after the disconnection process, the sub power storage devices have all been disconnected from the power supply system. Therefore, even if electric power feeding line PL2 has a voltage lower than the output voltages of batteries BB1, BB2, a short circuit path will not be formed between the batteries. Thus, after the disconnection process, converter 12A can be operated in the voltage holding mode so that a relation of VH=VBA holds.

Again with reference to FIG. 11, control device 30 further proceeds to step S560 to stop a request to step up voltage in view of the restriction as to batteries as described above. In other words, in view of the restriction relevant to batteries, converter 12A is permitted to stop stepping up voltage. As a result, in view of motor control, when it is not necessary that converter 12A steps up voltage, converter 12A can be operated in the voltage holding mode to reduce electric power loss.

Figure 13:
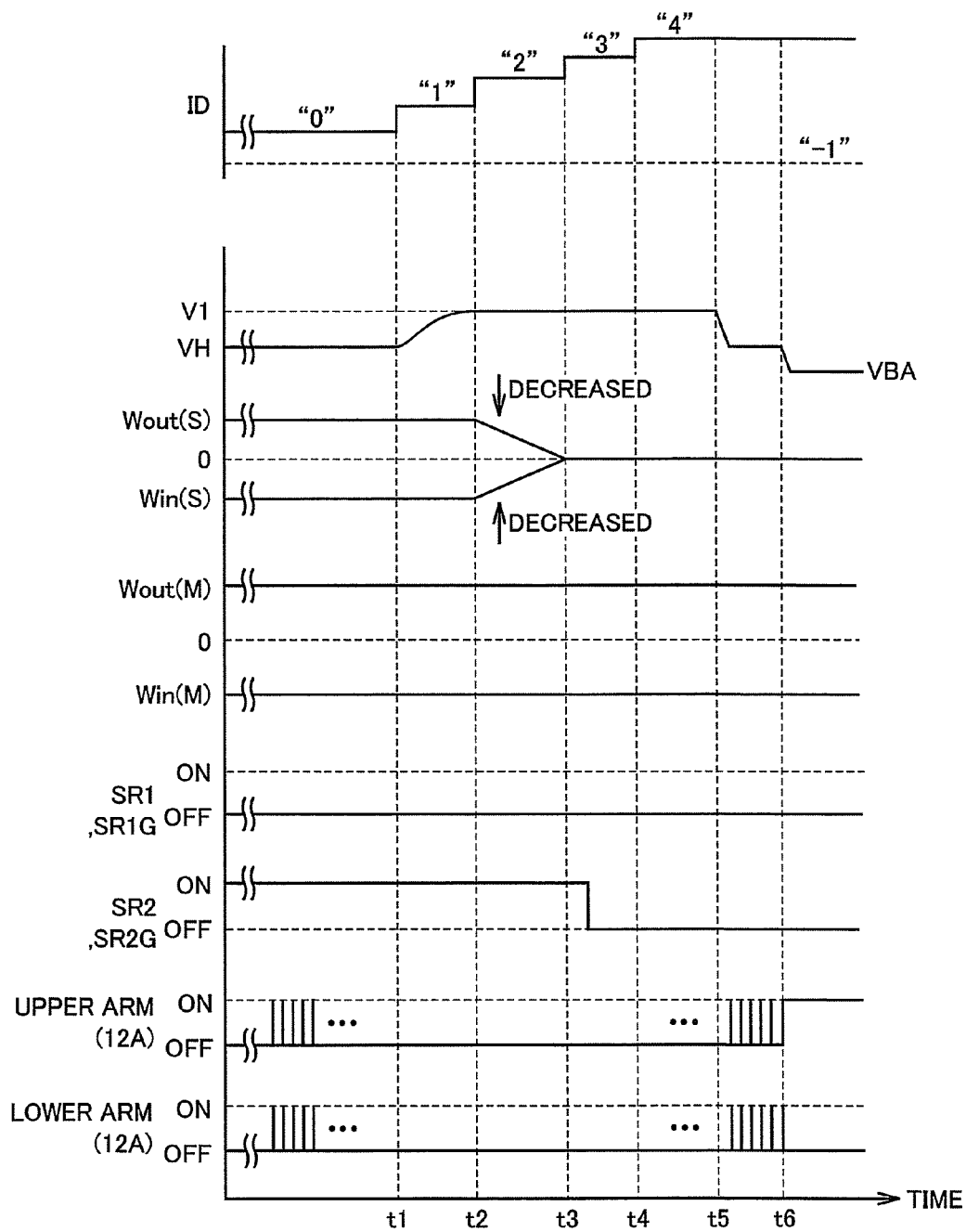
FIG. 13 is an operation waveform diagram for a process for disconnecting a selected sub power storage device in a power supply system for an electrically powered vehicle in an embodiment of the present invention.
Figure 14:
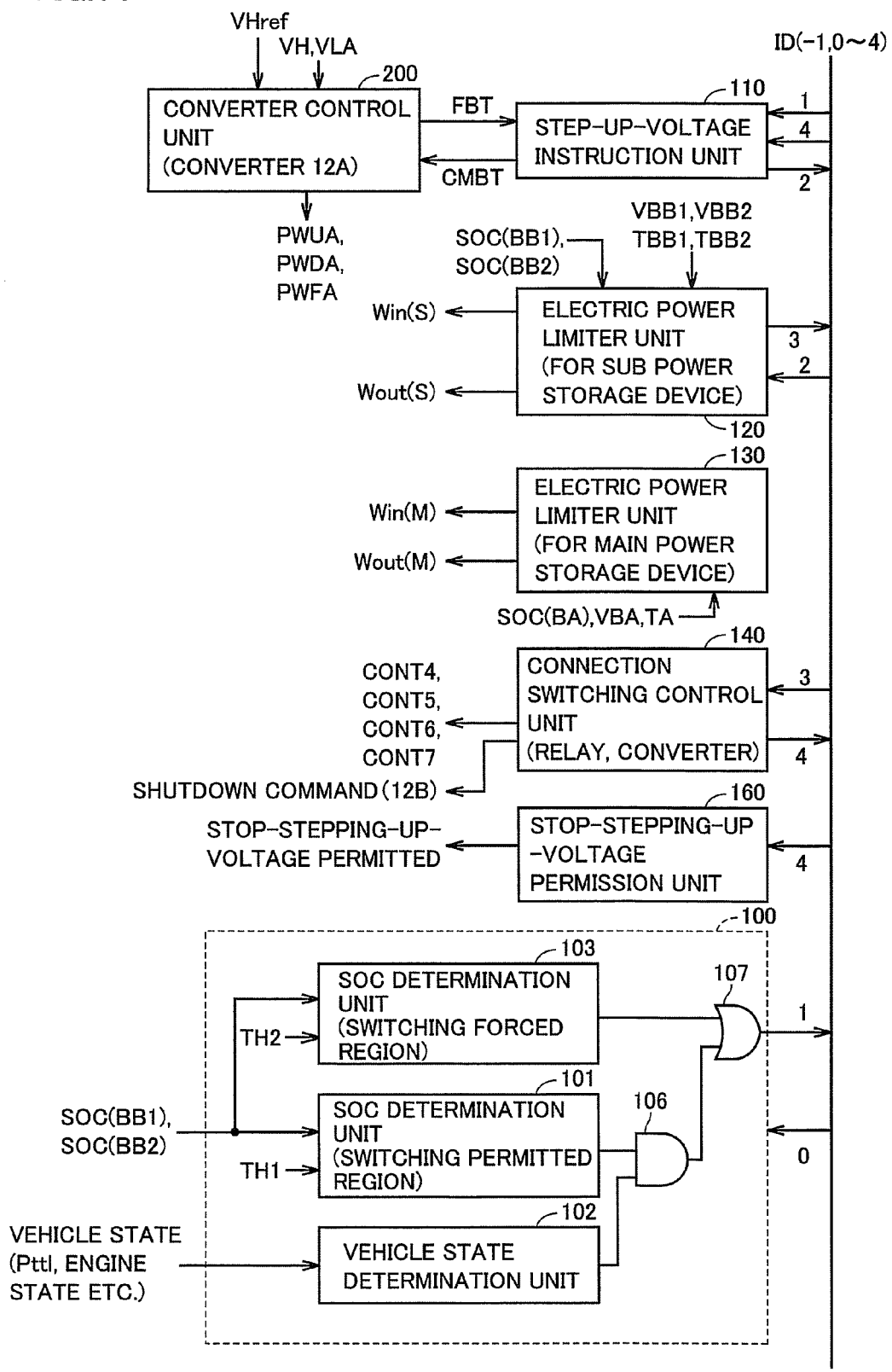
FIG. 14 is a functional block diagram for illustrating functional elements in a control configuration for a power supply system in an embodiment of the present invention, for disconnecting a selected sub power storage device.

FIG. 13 shows in waveform an operation performed in the disconnection process to disconnect a selected sub power storage device in the power supply system of the electrically powered vehicle in the embodiment of the present invention described with reference to FIGS. 5 to 11.

With reference to FIG. 12, in the period to time t1 in which the variable is ID=0, the disconnection determination process is performed periodically as predetermined, based on the SOC of the currently selected sub power storage device that is the last sub power storage device (battery BB2 for example). In the case where the variable is set to ID=−1 based on the determination made when the power supply system is activated, substantially the disconnection determination is not made and the parallel battery mode is maintained, as described above. Namely, the disconnection process for a sub power storage device will not be executed.

At time t1, in response to battery BB2 decreasing in SOC, the disconnection determination process (step S100) is performed to issue a disconnection request to disconnect selected sub power storage device BB, and the variable is set to ID=1 to start the disconnection process.

Thus, the pre-disconnection voltage step up process (step S200) is performed and converter 12A increases voltage VH on electric power feeding line PL2 toward predetermined voltage V1. A process for stepping up voltage on electric power feeding line PL2 is completed at time t2, and accordingly, the ID is changed from 1 to 2.

When the variable is set to ID=2, the electric power limit modification process (S300) is performed to decrease the upper limits on electric power input and output Win(S) and Wout(S) of selected sub power storage device BB toward 0 gradually at a fixed rate. Furthermore, converter 12B is controlled to stop charging/discharging the currently selected sub power storage device (battery. BB2). Alternatively, converter 12B may have been shut down since time t1.

At time t3, the upper limits on electric power input and output Win(S) and Wout(S) of selected sub power storage device BB are decreased to 0, and in response, ID is changed from 2 to 3. Once the variable is set to ID=3, disconnection of the sub power storage device is started. More specifically, with converter 12A shut down, relays SR2, SR2G having been the ON state are turned off, while relays SR1, SR1G are kept OFF. As a result, both batteries BB1 and BB2, namely all sub power storage devices are electrically disconnected from the power supply system. As the disconnection is completed, ID is changed from 3 to 4 at time t4.

Once the variable is changed to ID=4, the voltage step up process for electric power feeding line PL2 involved in the disconnection process is also stopped (time t5). Accordingly, voltage VH decreases from predetermined voltage V1. Then, the single battery mode is applied and electric power is supplied and collected by means of battery BA (main power storage device) only.

After the variable is changed to ID=4, it is not necessary to step up voltage in view of the restriction set for the batteries, as has been described above, and it is permitted to stop stepping up voltage by converter 12A. As such, at time t6 when voltage VH on electric power feeding line PL2 is equal to the output voltage of battery BA, and despite that motor generators MG1, MG2 become controllable, converter 12A operates in the voltage holding mode. In the voltage holding mode, the upper arm and the lower arm are held on/off, and an electric power loss caused at converter 12A can be reduced.

Reference will now be made to FIG. 13 to illustrate a configuration of functional elements that is a part of a control configuration for a power supply system in an embodiment of the present invention, and functions in the process for disconnecting a selected sub power storage device as described with reference to FIGS. 5 to 12. The functional blocks shown in FIG. 13 are each implemented by software processing through execution of a predetermined program or by dedicated electronic circuitry (hardware processing).

With reference to FIG. 13, a disconnection determination unit 100 includes an SOC determination unit 101 for a disconnection permitted region, an SOC determination unit 103 for a disconnection forced region and a vehicle state determination unit 102. Disconnection determination unit 100 operates periodically as predetermined when the variable is ID=0, but does not operate when the variable is ID≠0.

SOC determination unit 101 compares the SOC of currently selected sub power storage device BB (SOC(BB1) or SOC(BB2)) with reference value TH1, and accordingly sets the output signal to a low level (L level) when there is a relation of SOC≥TH1, and sets the output signal to a high level (H level) when there is a relation of SOC<TH1. Likewise, SOC determination unit 103 compares the SOC of selected sub power storage device BB with reference lower limit TH2, sets the output signal to the low level (L level) when there is a relation of SOC≥TH2, and sets the output signal to the high level (H level) when there is a relation of SOC<TH2.

Vehicle state determination unit 102 makes determination in order to check the vehicle state in step S130 of FIG. 6. When the vehicle state is such that the determination in step S130 is YES, the output signal is set to the H level. When the vehicle state is such that the determination is NO, the output signal set to the L level.

A logic gate 106 outputs the result of an AND logical operation for respective output signals of SOC determination unit 101 and vehicle state determination unit 102. Specifically, when both of respective output signals of SOC determination unit 101 and vehicle state determination unit 102 are the H level, logic gate 106 outputs a signal of the H level and otherwise, outputs a signal of the L level.

A logic gate 107 outputs the result of an OR operation for respective output signals of logic gate 106 and SOC determination unit 103. Thus, when there is a relation of SOC<TH2 (the output signal of SOC determination unit 103 is the H level) or when there is a relation of SOC<TH1 and the vehicle state is such that the sub power storage device can be disconnected (the output signal of logic gate 106 is the H level), the output signal of logic gate 107 is the H level and the variable is set to ID=1. Otherwise, the variable of ID=0 is maintained.

As seen from above, disconnection determination unit 100 shown in FIG. 13 can also generate the disconnection request (ID: 0→1) in a similar manner to the flowchart shown in FIG. 6.

The function of SOC determination unit 101 corresponds to "first determination unit", the functions of vehicle state determination unit 102 and logic gates 106, 107 correspond to "second determination unit" and the functions of SOC determination unit 103 and logic gate 107 correspond to "third determination unit".

When a request to disconnect the selected sub power storage device is generated and the variable is set to ID=1, a step-up-voltage instruction unit 110 outputs a step up voltage command signal CMBT to a converter control unit 200 that controls converter 12A.

Converter control unit 200 generates control signals PWUA, PWDA, PDFA for converter 12A, based on voltages VH, VLA and voltage command value VHref, so that voltage VH on electric power feeding line PL2 reaches voltage command value VHref.

Further, when step-up-voltage instruction unit 110 generates step up voltage command signal CMBT, converter control unit 200 sets the voltage command value to VHref=V1 and generates control signal PWUA. When voltage sensor 13 senses voltage VH having reached predetermined voltage V1 and being kept at the voltage continuously for at least a predetermined period of time, converter control unit 200 sets a flag FBT ON indicating that the voltage has been stepped up.

In response to flag FBT that is set ON, step-up-voltage instruction unit 110 changes the variable to ID=2, and continues outputting step up voltage command signal CMBT until a disconnection control unit 140, which will be described later, completes turning off of all relays and accordingly the variable is set to ID=4. In other words, the function of step-up-voltage instruction unit 110 corresponds to step S200 of FIG. 5 and step S550 of FIG. 11.

An electric power limiter unit 120 sets the upper limits on electric power input and output Win(S) and Wout(S) of selected sub power storage device BB. Normally, the upper limits on electric power input and output Win(S) and Wout(S) are set based on the SOC of the battery, namely selected sub power storage device BB (SOC(BB1) or SOC(BB2)), the battery temperature (TBB1 or TBB2) and the output voltage (VB1 or VB2) thereof.

In contrast, in the process for disconnecting the selected sub power storage device, when the variable is ID=2, electric power limiter unit 120 decreases the upper limits on electric power input and output Win(S) and Wout(S) gradually at a fixed rate toward zero and, when Win(S) and Wout(S) reach zero, changes ID from 2 to 3.

In other words, electric power limiter unit 120 implements the processes in steps S320, S330 of FIG. 9 and the function of "electric power limiter unit" of the present invention.

An electric power limiter unit 130 sets the upper limits on electric power input and output Win(M) and Wout(M) of main power storage device BA. Normally, the upper limits on electric power input and output Win(M) and Wout(M) are set based on the SOC(BA) of main power storage device BA as well as battery temperature TA and output voltage VA thereof. In the disconnection process as well, the upper limits on electric power input and output Win(M) and Wout(M) are set in a similar manner to the one in those periods other than the period in which the disconnection process is performed.

When electric power limiter unit 120 sets the variable to ID=3, disconnection control unit 140 in response generates a command to shut down converter 12B. Furthermore, disconnection control unit 140 generates relay control signals CONT4 to CONT7 to turn off all relays SR1, SR1G, SR2, SR2G. Once this disconnection operation (or turning off of all relays) has been completed, ID is changed from 3 to 4. Disconnection control unit 140 corresponds to step S400 of FIG. 5 (S405 to S430 of FIG. 10). The variable is set to ID=4 and accordingly the shift to the single battery mode is completed.

When disconnection control unit 140 sets the variable to ID=4, a stop-stepping-up-voltage permission unit 160 in response generates a permission for converter 12A to stop stepping up voltage. Voltage command value VHref is thus not increased in view of the restriction relevant to the batteries and will be set with only the states respectively of motor generators MG1, MG2 reflected therein. As a result, as shown in FIG. 12, converter 12A can be operated in the voltage holding mode allowing reduced electric power loss.

As heretofore described, the power supply system for an electrically powered vehicle in the present embodiment provides two different references for making determination as to disconnection based on the residual capacity (SOC) of a sub power storage device that is used last in the parallel battery mode. Accordingly, where the SOC falls within the disconnection forced region (SOC<TH2), a request to disconnect the sub power storage device is forced to be generated regardless of the vehicle state for the sake of battery protection. In contrast, where the SOC falls within the disconnection permitted region (TH1≤SOC<TH2) before falling into the disconnection forced region, the disconnection process can be performed when the vehicle is in such a state that will not affect the vehicle's drivability.

Accordingly, in the power supply system configured to share one voltage converter (converter) by a plurality of sub power storage devices, when the last-selected sub power storage device is used, the determination as to shift to the single battery mode (determination as to disconnection) can be made appropriately in consideration of both of battery protection and vehicle's ensured drivability.

Further, in the process for disconnecting a sub power storage device in use, the sub power storage device is disconnected after the voltage on electric power feeding line PL2 is increased. Therefore, in the disconnection process, a short circuit path between power storage devices (batteries) can surely be prevented from being formed in the system. Furthermore, in the process for disconnecting a selected sub power storage device, the upper limits on electric power input and output Win(S) and Wout(S) of selected sub power storage device BB are gradually decreased and thereafter the sub power storage device is actually disconnected, so that the power supply system can be prevented from being requested to charge or discharge to an excessive extent.

Furthermore, shifting to the single battery mode allows converter 12A to operate in the voltage holding mode. Reduced electric power loss and hence improved fuel-efficiency of electrically powered vehicle 1 can thus be accomplished.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST

1 electrically powered vehicle; 2 wheel; 3 power split device; 4 engine; 6 battery charging converter (external charging); 8 external power supply; 9A, 9B1, 9B2 current sensor; 10A, 10B1, 10B2, 13, 21A, 21B voltage sensor; 11A, 11B1, 11B2 temperature sensor; 12A converter (dedicated to main power storage device); 12B converter (shared by sub power storage devices); 14, 22 inverter; 15-17 each phase arm (U, V, W); 24, 25 current sensor; 30 control device; 39A connection unit (for main power storage device); 39B connection unit (for sub power storage device); 100 disconnection determination unit; 101 SOC determination unit (disconnection permitted region); 102 vehicle state determination unit; 103 SOC determination unit (disconnection forced region); 106, 107 logic gate; 110 step-up-voltage instruction unit; 120 electric power limiter unit (for sub power storage device); 130 electric power limiter unit (for main power storage device); 140 disconnection control unit; 160 stop-stepping-up-voltage permission unit; 200 converter control unit; 250 traveling control unit; 260 total power calculation unit; 270, 280 inverter control unit; BA battery (main power storage device); BB selected sub power storage device; BB1, BB2 battery (sub power storage device); C1, C2, CH smoothing capacitor; CMBT step up voltage command signal; CONT1-CONT7 relay control signal; D1-D8 diode; FBT flag (stepping up voltage completed); IA, IB1, IB2 input/output current (battery); ID variable (status of disconnection process); IGON start signal; L1 reactor; MCRT1, MCRT2 motor current value; MG1, MG2 motor generator; PL1A, PL1B power supply line; PL2 electric power feeding line; Ptt1 total required power; PWMI, PWMI1, PWMI2, PWMC, PWMC1, PWMC2 control signal (for inverter); PWF, PWFA, PWFB, PWU, PWUA, PWDA, PWD, PWDA, PWDB control signal (for converter); Q1-Q8 IGBT device; R limiting resistor; SL1, SL2 ground line; SMR1-SMR3 system main relay; SR1, SR1G, SR2, SR2G relay; TA, TBB1, TBB2 battery temperature (battery); TH1 reference value (SOC); TH2 reference lower limit (SOC); Tqcom1, Tqcom2 torque command value; UL, VL, WL line (three-phase), V1 predetermined voltage; VBA, VBB1, VBB2 voltage (battery output voltage); VLA, VLB, VH voltage; VHref voltage command value (VH); VHA, VHB lower limit of VH control range; Win upper limit on electric power input; Win(M) upper limit on electric power input (to main power storage device); Win(S) upper limit on electric power input (to selected sub power storage device); Wout upper limit on electric power output; Wout(M) upper limit on electric power output (from main power storage device); Wout(S) upper limit on electric power output (from selected sub power storage device)

The invention claimed is:

1. A power supply system for an electrically powered vehicle mounted with a motor for generating power to drive the vehicle, comprising:
a main power storage device;
an electric power feeding line for supplying electric power to an inverter that controls and drives said motor;
a first voltage converter provided between said electric power feeding line and said main power storage device and configured to convert voltage bidirectionally;
a plurality of sub power storage devices provided in parallel to each other;
a second voltage converter provided between said plurality of sub power storage devices and said electric power feeding line and configured to convert voltage between one of said plurality of sub power storage devices and said electric power feeding line bidirectionally;
a connection unit provided between said plurality of sub power storage devices and said second voltage converter and configured to control connection and disconnection between said plurality of sub power storage devices and said second voltage converter; and
a control device operative in a first mode for controlling said connection unit to connect a selected sub power storage device selected sequentially from said plurality of sub power storage devices to said second voltage converter and also disconnect the sub power storage device other than said selected sub power storage device from said second voltage converter, and operative in a second mode for controlling said connection unit to disconnect each of said plurality of sub power storage devices from said second voltage converter,
said control device including:
a first determination unit configured to detect a first state where a residual capacity of said selected sub power storage device currently in use is smaller than a first reference value set in advance, when no sub power storage device replaceable with said selected sub power storage device currently in use is left in said first mode;
a second determination unit configured to generate a disconnection request for giving an instruction to shift said first mode to said second mode, depending on a vehicle state of said electrically powered vehicle, when said first determination unit detects said first state; and
a third determination unit configured to generate said disconnection request regardless of said vehicle state, when no sub power storage device replaceable with said selected sub power storage device currently in use is left in said first mode and a second state is detected where the residual capacity of said selected sub power storage device falls below a second reference value smaller than said first reference value.

2. The power supply system for an electrically powered vehicle according to claim 1, wherein
said second determination unit is configured to generate said disconnection request on condition that a total required power of said electrically powered vehicle is smaller than a reference value when said first determination unit detects said first state.

3. The power supply system for an electrically powered vehicle according to claim 2, wherein
said reference value is set in a variable manner based on an upper limit on electric power output of said main power storage device.

4. The power supply system for an electrically powered vehicle according to claim 1, wherein
said electrically powered vehicle is further mounted with:
an internal combustion engine configured to output power to drive the vehicle independently of said motor; and
a traveling control unit for dividing and thus assigning a total required power of said electrically powered vehicle to power output from said motor and power output from said internal combustion engine, and
said second determination unit is configured to generate said disconnection request on condition that said internal combustion engine is operating when said first determination unit detects said first state.

5. The power supply system for an electrically powered vehicle according to claim 1, wherein
said control device further includes:
a step-up-voltage instruction unit configured to instruct said first voltage converter to provide a voltage on said electric power feeding line to be a first voltage higher than at least voltages output from said main power storage device and said plurality of sub power storage devices, respectively, when said disconnection request is generated;
an electric power limiter unit configured to decrease an upper limit on electric power input and output of said selected sub power storage device gradually to zero after said voltage on said electric power feeding line has reached said first voltage;
a disconnection control unit instructing said connection unit to disconnect said selected sub power storage device from said second voltage converter and also hold the sub power storage device other than said selected sub power storage device disconnected from said second voltage converter, when said electric power limiter unit sets to zero said upper limit on electric power input and output; and
a stop-stepping-up-voltage permission unit configured to decrease a lower limit of a voltage control range for said electric power feeding line to be smaller than the lower limit in said first mode to set said lower limit to an output voltage of said main power storage device, after said disconnection control unit disconnects each of said sub power storage devices from said second voltage converter.

6. A method to control a power supply system for an electrically powered vehicle mounted with a motor for generating power to drive the vehicle, wherein said power supply system includes a main power storage device, an electric power feeding line supplying electric power to an inverter that controls and drives said motor, a first voltage converter provided between said electric power feeding line and said main power storage device and configured to convert voltage bidirectionally, a plurality of sub power storage devices provided in parallel to each other, a second voltage converter provided between said plurality of sub power storage devices and said electric power feeding line and configured to convert voltage between one of said plurality of sub power storage devices and said electric power feeding line bidirectionally, a connection unit provided between said plurality of sub power storage devices and said second voltage converter and configured to control connection and disconnection between said plurality of sub power storage devices and said second voltage converter, and a control device operative in a first mode to control said connection unit to connect a selected sub power storage device selected sequentially from said plurality of sub power storage devices to said second voltage converter and also disconnect the sub power storage device other than said selected sub power storage device from said second voltage converter, and operative in a second mode to control said connection unit to disconnect each of said plurality of sub power storage devices from said second voltage converter, said method comprising the steps of:

detecting, by the control device to control said connection unit, a first state where a residual capacity of said selected sub power storage device currently in use is smaller than a first reference value set in advance, when no sub power storage device replaceable with said selected sub power storage device currently in use is left in said first mode;

generating, by the control device to control said connection unit, a disconnection request for giving an instruction to shift said first mode to said second mode, depending on a vehicle state of said electrically powered vehicle, when said first state is detected in said step of detecting; and generating, by the control device to control said connection unit, said disconnection request regardless of said vehicle state, when no sub power storage device replaceable with said selected sub power storage device currently in use is left in said first mode and a second state is detected where the residual capacity of said selected sub power storage device falls below a second reference value smaller than said first reference value.

7. The method to control a power supply system for an electrically powered vehicle according to claim 6, wherein in said step of generating a disconnection request, said disconnection request is generated, by the control device, on condition that a total required power of said electrically powered vehicle is smaller than a reference value when said first state is detected in said step of detecting.

8. The method to control a power supply system for an electrically powered vehicle according to claim 7, wherein said reference value is set, by the control device, in a variable manner based on an upper limit on electric power output of said main power storage device.

9. The method to control a power supply system for an electrically powered vehicle according to claim 6, wherein said electrically powered vehicle is further mounted with an internal combustion engine configured to output power to drive the vehicle independently of said motor, and in said step of generating a disconnection request, said disconnection request is generated, by the control device, on condition that said internal combustion engine is operating when said first state is detected in said step of detecting.

10. The method to control a power supply system for an electrically powered vehicle according to claim 6, further comprising the steps of:

instructing, by the control device, said first voltage converter to provide a voltage on said electric power feeding line to be a first voltage higher than at least voltages output from said main power storage device and said plurality of sub power storage devices, respectively, when said disconnection request is generated;

decreasing, by the control device, an upper limit on electric power input and output of said selected sub power storage device gradually to zero after said voltage on said electric power feeding line has reached said first voltage;

instructing, by the control device, said connection unit to disconnect said selected sub power storage device from said second voltage converter and also hold the sub power storage device other than said selected sub power storage device disconnected from said second voltage converter, when said upper limit on electric power input and output is set to zero in said step of decreasing; and decreasing, by the control device, a lower limit of a voltage control range for said electric power feeding line to be smaller than the lower limit in said first mode to set said lower limit to an output voltage of said main power storage device, after each of said sub power storage devices is disconnected from said second voltage converter in said step of instructing said connection unit.

* * * * *